(12) United States Patent
Rogers

(10) Patent No.: US 7,378,619 B2
(45) Date of Patent: May 27, 2008

(54) CONFECTIONARY LIQUID SERVING ASSEMBLY

(76) Inventor: William Rogers, 4650 Whitehall La., Algonquin, IL (US) 60102

( * ) Notice: Subject to any disclaimer, the term of this patent is extended or adjusted under 35 U.S.C. 154(b) by 111 days.

(21) Appl. No.: 11/341,972

(22) Filed: Jan. 27, 2006

(65) Prior Publication Data
US 2007/0175887 A1    Aug. 2, 2007

(51) Int. Cl.
*F27D 11/00*    (2006.01)
*E03B 9/20*    (2006.01)

(52) U.S. Cl. .............. 219/438; 219/385; 219/386; 219/429; 219/432; 219/433; 239/16; 239/24; 239/28; 239/17; 392/442; 222/146.5

(58) Field of Classification Search .......... 219/385, 219/386, 429, 432, 433, 438; 239/16, 24, 239/28, 17; 392/442; 222/146.5
See application file for complete search history.

(56) References Cited

U.S. PATENT DOCUMENTS

| | | | |
|---|---|---|---|
| 2,915,024 A | 12/1959 | Kruger et al. | |
| 3,021,779 A | 2/1962 | Sollich | |
| 4,032,779 A | 6/1977 | Arnold et al. | |
| 4,094,446 A | 6/1978 | Brutsman | |
| 4,526,300 A | 7/1985 | Woody | |
| 5,718,356 A | 2/1998 | Nottingham et al. | |
| 5,794,820 A | 8/1998 | Shabbits et al. | |
| 6,216,911 B1 | 4/2001 | Kreitemier | |
| 6,311,868 B1 | 11/2001 | Krietemeier | |
| 6,460,736 B1 | 10/2002 | D'Agostino | |
| 6,530,530 B1 | 3/2003 | Peterson | |
| 6,695,222 B1 | 2/2004 | Lin | |
| 6,730,344 B1 | 5/2004 | Sanders et al. | |
| 2001/0038020 A1 | 11/2001 | Schalow et al. | |
| 2003/0118699 A1* | 6/2003 | Nicosia | 426/104 |
| 2003/0129921 A1 | 7/2003 | Small et al. | |
| 2005/0092852 A1 | 5/2005 | Muir et al. | |
| 2005/0092853 A1 | 5/2005 | Muir et al. | |

FOREIGN PATENT DOCUMENTS

WO    WO2006049644    * 11/2006

* cited by examiner

*Primary Examiner*—Shawntina Fuqua
(74) *Attorney, Agent, or Firm*—Meroni & Meroni, P.C.; Charles F. Meroni, Jr.; Christopher J. Scott

(57) ABSTRACT

A confectionary fountain assembly enables user to self-serve confectionary liquid, such as liquid chocolate. The fountain assembly comprises a base assembly, a conduit assembly, a functional sculpture, and an annular basin. The base assembly supports a bowl-shaped receptacle and houses a heating element and a motor assembly for respectively providing chocolate-liquefying thermal energy and rotational movement. The conduit assembly is coupled to the motor assembly and the receptacle and comprises a liquid chocolate lifting auger. The sculpture assembly receives the lifted chocolate and imparts pressure thereto for further directing the chocolate to a sculpture outlet. The chocolate, upon exiting the outlet, covers an outer decorative surface of the sculpture and returns to the receptacle. The outer basin is supported in concentric relation about the receptacle and provides a second pooled confectionary liquid source, the pooled confectionary liquid sources and the outlet confectionary liquid enabling the user to self-serve confectionary liquid.

11 Claims, 6 Drawing Sheets

CONFECTIONARY LIQUID SERVING ASSEMBLY

BACKGROUND OF THE INVENTION

1. Field of the Invention

The present invention generally relates to a consumable liquid serving assembly for enabling consumers to self-serve consumable liquid from the assembly. More particularly, the present invention relates to a confectionary liquid fountain assembly comprising a sculpture assembly for providing consumers with both pooled and flowing confectionary liquid sources. The confectionary liquid sources cooperate with the sculpture assembly for enabling the consumer to coat morsels of food and the like with confectionary liquid, such as chocolate, without having to contact the actual structure of the fountain assembly.

2. Description of Prior Art

Confectionary liquid fountains such as liquid chocolate fountains and the like are known in the prior art. Some of the more popular means for decoratively providing a flow of liquid chocolate are essentially taught by Muir et al. as described in more detail hereinafter. Other decorative fountains and means for coating articles with chocolate are also briefly described.

U.S. Pat. No. 6,530,530, ('530 Patent) which issued to Peterson, discloses a Decorative Fountain. The '530 Patent teaches decorative fountains, assemblies for fountains and decorative fountain kits. An assembly for a decorative fountain includes an overflow container defining a reservoir and an outlet in fluid communication with the reservoir, a support surface defining one or more apertures and positioned over the reservoir for supporting a drinking vessel, a support conduit defining a passageway for fluid and having a first end fluidly connected to the outlet and an opposite end defining an aperture. A bottle inlet is in fluid communication with the support conduit and is configured to mate with an inlet opening defined through the base of the beverage container so that the aperture is in fluid communication with the vessel. A pump is disposed within the reservoir and is operable to pump fluid from the reservoir through the passageway and into the vessel.

U.S. Pat. No. 6,695,222 ('222 Patent), which issued to Lin, discloses a Decorative Fountain. The '222 Patent teaches a decorative fountain comprising a hollow body having a recessed area provided with a nappe zone and a shower zone, and a reservoir defined in a bottom portion of the hollow body for receiving therein water. A water pump assembly is received in the reservoir for pumping water in the reservoir to the inlet of the control valve to selectively sprinkle water out of the primary outlet, the secondary outlet or the third outlet. A cover is mounted on top of the hollow body to cover the recessed area and has a controlling knob rotatably mounted inside the cover. Therefore, rotation of the controlling knob is able to control activation of the primary outlet, the secondary outlet and the third outlet to sprinkle water from the reservoir to either the nappe zone or the shower zone.

U.S. Pat. No. 6,730,344 ('344 Patent), which issued to Sanders et al., discloses a Method and Apparatus of Coating Articles. The '344 Patent teaches coating methods whereby liquid milk chocolate may be applied to articles such as confectionery bars. The bars are conveyed by conveyor under a curtain of liquid chocolate issuing through an outlet slot in a trough. A layer of air is caused to flow through the outlet slot in the trough so as to modify the flow characteristics of the curtain. The layer of air permits a curtain of even thickness to be achieved.

United States Patent Application Publication No. US2001/0038020, authored by Schalow et al., discloses a dispenser for dispensing viscous liquid from a flexible viscous liquid containing bag having a dispensing opening is provided. The dispenser includes a support plate that is adapted to support the flexible viscous liquid containing bag. A squeegee carriage having a squeegee attached thereto is also provided. The squeegee carriage is mounted for movement from an initial, upper position downwardly along the support plate to a lower position. The squeegee is adapted to press the flexible viscous liquid containing bag against the support plate to squeeze the viscous liquid from the dispensing opening. A flexible bag for use with the dispenser is also provided.

United States Patent Application Publication No. US 2005/0092852 and United States Patent Application Publication No. US 2005/0092853, authored by Muir et al., disclose a fountain for heating and distributing fluidic material is manufactured using various processes and materials so that the fountain is more easily cleaned and sanitized, has improved performance, and is easier to assemble. In one embodiment, the chocolate fountain includes a heating element encased in an aluminum enclosure. A basin containing chocolate is heated by contact with the aluminum enclosure. Because the aluminum enclosure has a relatively high thermal conductivity, the basin is heating substantially uniformly, thus reducing the occurrence of hot spots. Additionally, a plastic auger having a spiral flight rotates and lifts the melted chocolate upward to a top end of cylinder that houses the auger. The use of a plastic auger advantageously eliminates welding artifacts on the auger, such as burrs and pits, on which melted chocolate may accumulate. Accordingly, the plastic auger is easy to clean.

From an inspection of the foregoing disclosures and from a consideration of other art generally known to exist it will be seen that the prior art fails to teach a combination liquid chocolate fountain assembly comprising a base assembly, a conduit assembly, a decorative sculpture, and an annular basin for providing users with at least two distinct pooled liquid chocolate sources (providing two types of chocolate) and a flowing liquid chocolate source whereby the user or consumer need not ever contact the structure of the fountain assembly in order to coat morsels with liquid chocolate. The prior art thus perceives a need for a combination liquid chocolate fountain assembly or serving assembly comprising a base assembly, a conduit assembly, a decorative sculpture, and an annular basin for providing users or consumers with at least two pooled liquid chocolate sources and a flowing liquid chocolate source whereby the user or consumer need not ever contact the structure of the fountain assembly in order to coat morsels with liquid chocolate.

SUMMARY OF THE INVENTION

Accordingly, it will be seen, in contradistinction to the foregoing prior art, that the present invention provides a uniquely configured confectionary liquid (e.g. liquid chocolate) fountain assembly comprising a base assembly, a liquid elevation assembly, a functional sculpture assembly, and an annular or outer basin for enabling a user to self-serve consumable liquid(s) (for coating or dipping morsels and the like) from either flowing consumable liquid or pooled consumable liquid having two possible distinct sources.

The base assembly essentially comprises a circular bowl assembly, a housing assembly, certain heat-generating means, and a motor assembly. The circular bowl assembly comprises a bowl-shaped receptacle and certain conduit-retaining means. The bowl-shaped receptacle comprises certain heat-conductive material(s), an outer rim, a bowl diameter, and a central shaft-receiving aperture. The housing assembly comprises certain heat-controlling means, certain motor-controlling means, and electrical circuitry. The motor assembly comprises a drive shaft and certain shaft-rotating means. The electrical circuitry is in electrical communication with a power source and communicates the power source with both the heat-generating means and the motor assembly. The motor-controlling means enable the operator to selectively control the shaft-rotating means (for example the revolutions per minute) for rotating the drive shaft, the drive shaft thus having an axis of rotation extending therethrough.

The liquid elevation assembly comprises an outer conduit assembly and an inner auger. The conduit assembly comprises a conduit member and certain bowl-attachment means. The conduit member comprises a first conduit end, a second conduit end, and a substantially uniform inner conduit diameter for rotatably receiving the auger. The auger comprises a first auger end, a second auger end, and a substantially uniform dynamic auger diameter, rotatably received within the conduit member in inward adjacency to the inner conduit diameter.

The housing assembly supports the bowl-shaped receptacle and the drive shaft of the motor assembly extends through the shaft-receiving aperture of the bowl-shaped receptacle. The first auger end is operatively coupled to the exposed portion of the drive shaft and the bowl-attachment means attach the first conduit end to the conduit-retaining means thereby defining a liquid inlet at the first auger end. An initial quantity of heat-liquefiable (consumable) matter may then be received in the bowl-shaped receptacle and with use of the heat-controlling means the user may selectively generate thermal energy by way of the heat-generating means. The selectively generated thermal energy is transferred into the initial quantity of liquefiable matter via the heat conductive material of the bowl-shaped receptacle thus forming a first pooled consumable liquid source. The auger may then raise the consumable liquid from the pooled consumable liquid source via the conduit member to the second conduit and auger ends.

The sculpture assembly comprises a first sculpture end, a second sculpture end, an outer decorative surface, and an inner liquid-diverting junction. The liquid-diverting junction is spatially located intermediate the first and second sculpture ends and comprises a junction inlet, at least one liquid channel, and at least one liquid outlet at the second sculpture end. The junction inlet has an inlet area and is tightly coupled to the second conduit end for creating hydraulic pressure within the rising consumable liquid. The liquid channel extends from the junction inlet to the liquid outlet and has a transverse cross-sectional channel area lesser in magnitude than the inlet area. The hydraulic pressure thus forces rising consumable liquid from the junction inlet to the liquid outlet. The outlet liquid flows under gravitational force (as guided by the outer decorative surface) and coats the outer decorative surface eventually returning (if not eaten or otherwise removed from the flow) to the bowl-shaped receptacle. Thus, the flowing consumable liquid and the pooled consumable liquid source enable the user to self-serve consumable liquid for the exemplary purpose of coating morsels.

The consumable liquid fountain assembly may further comprise an annular basin cooperable with the base assembly for providing a secondary or second pooled consumable liquid source. The annular basin also comprises a heat-conductive material and inherently has an inner basin diameter and an outer basin diameter. In a preferred combination, the annular basin further comprises an annular flange extending radially inward from the inner basin diameter. The annular flange has an inner flange diameter lesser in magnitude than the inner basin diameter such that the inner basin diameter is greater in magnitude than the bowl diameter and the inner flange diameter is lesser in magnitude than the bowl diameter. The annular basin may thus seat down upon the bowl-shaped receptacle via the annular flange and the outer rim.

As earlier introduced, a second quantity of heat-liquefiable consumable matter may be received in the annular basin and the selectively generated thermal energy is transferred into the second quantity of liquefiable chocolate via the heat conductive material of the bowl-shaped receptacle and the annular basin thus forming a second pooled consumable liquid source. The flowing consumable liquid and both pooled consumable liquid sources may thus enable the user to coat morsels with consumable liquid or otherwise self-serve the liquid for its intended effect as the user may elect.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of patent drawings, as follows.

DETAILED DESCRIPTION OF THE PREFERRED EMBODIMENT

Figure 1:
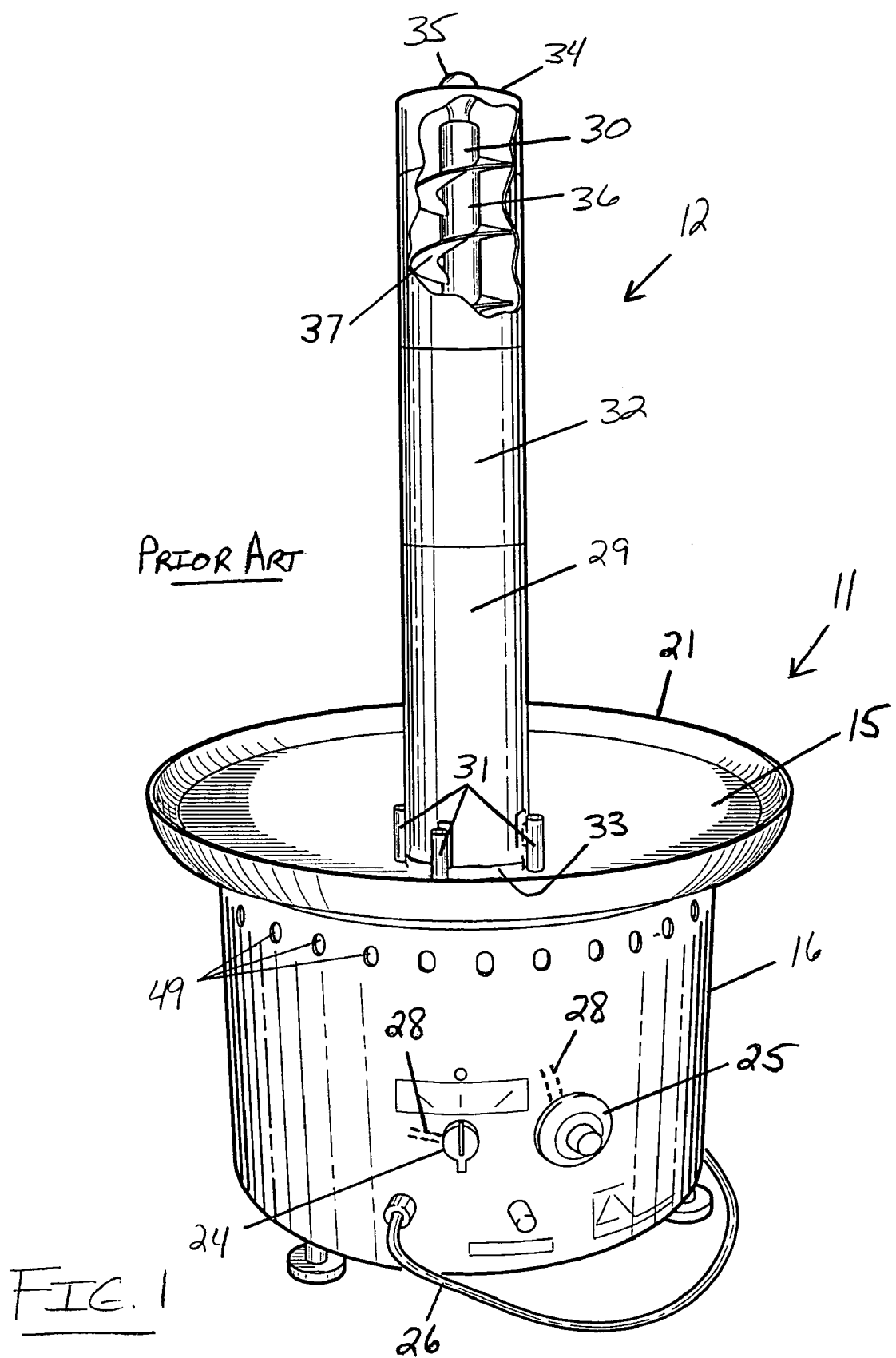
FIG. 1 is a perspective view of a prior art base assembly and conduit assembly in assembled relation with certain parts of the conduit assembly broken away to show a rotatably received auger assembly.

Referring now to the drawings, the preferred embodiment of the present invention generally concerns a consumable liquid fountain assembly for enabling users thereof to self-serve consumable liquid. It is contemplated that consumable liquids are often provided or served in the form of confectionary liquids, such as chocolate (milk, white, semi sweet and/or dark chocolate, which chocolates may include available additives such as any number of colorings and flavorings, and liquor), caramel, peanut butter, jellies or jams, honey, syrup(s), etc. Other consumable liquids, however, may include butter, cheese, barbecue sauces (or other sauces), creams, etc. For ease of illustration and description, the fountain assembly has been illustrated and described with liquid chocolate in view and thus the present invention may be considered as concerning a liquid chocolate serving assembly or fountain assembly 10 as generally illustrated and referenced in a fully assembled state in FIGS. 5 and 6.

Figure 4:
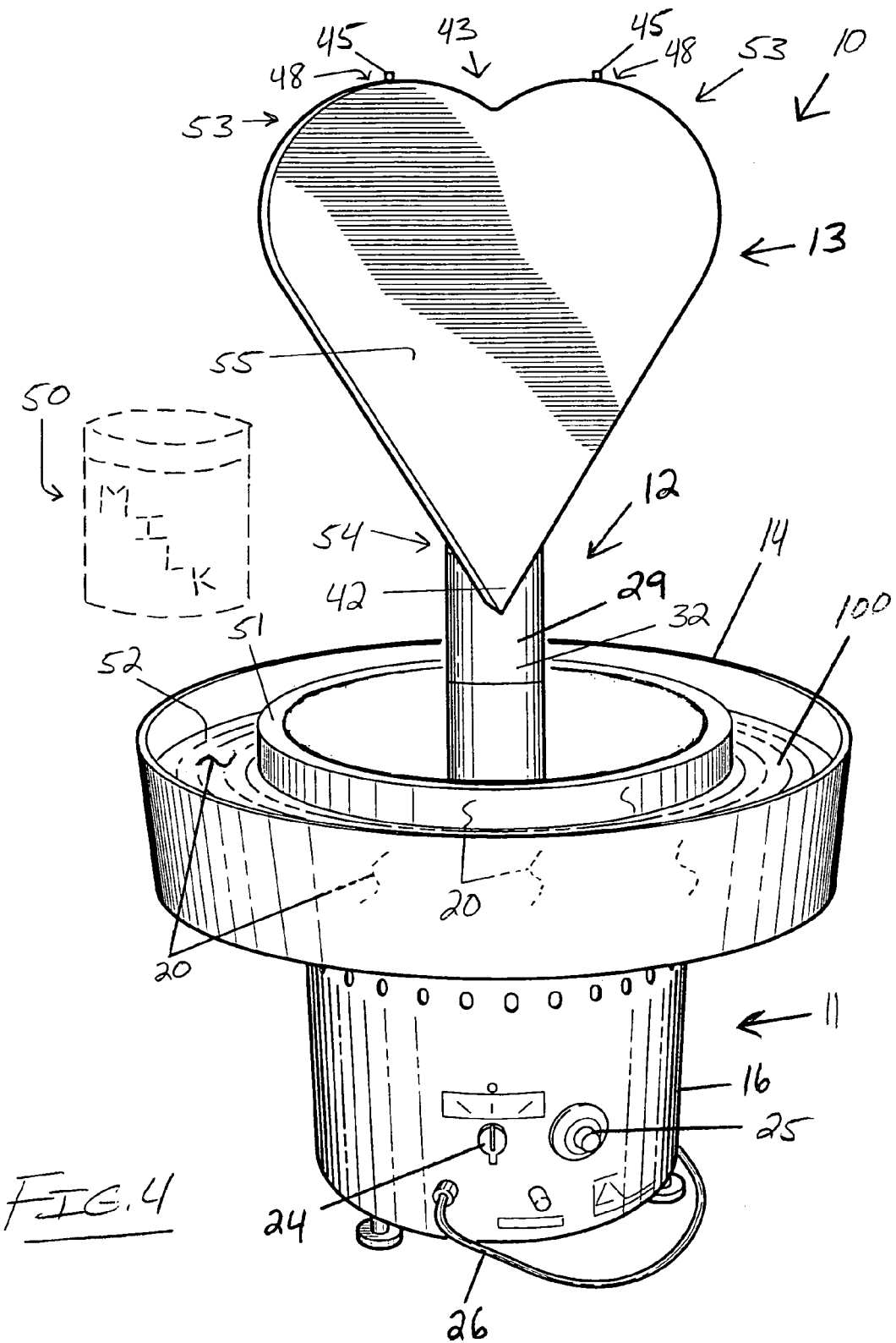
FIG. 4 is a perspective view of the base assembly, the conduit assembly, the annular basin, and the sculpture assembly in assembled relation with a 'MILK' chocolate source shown in broken lines and a pooled liquid chocolate source shown in the annular basin.
Figure 5:
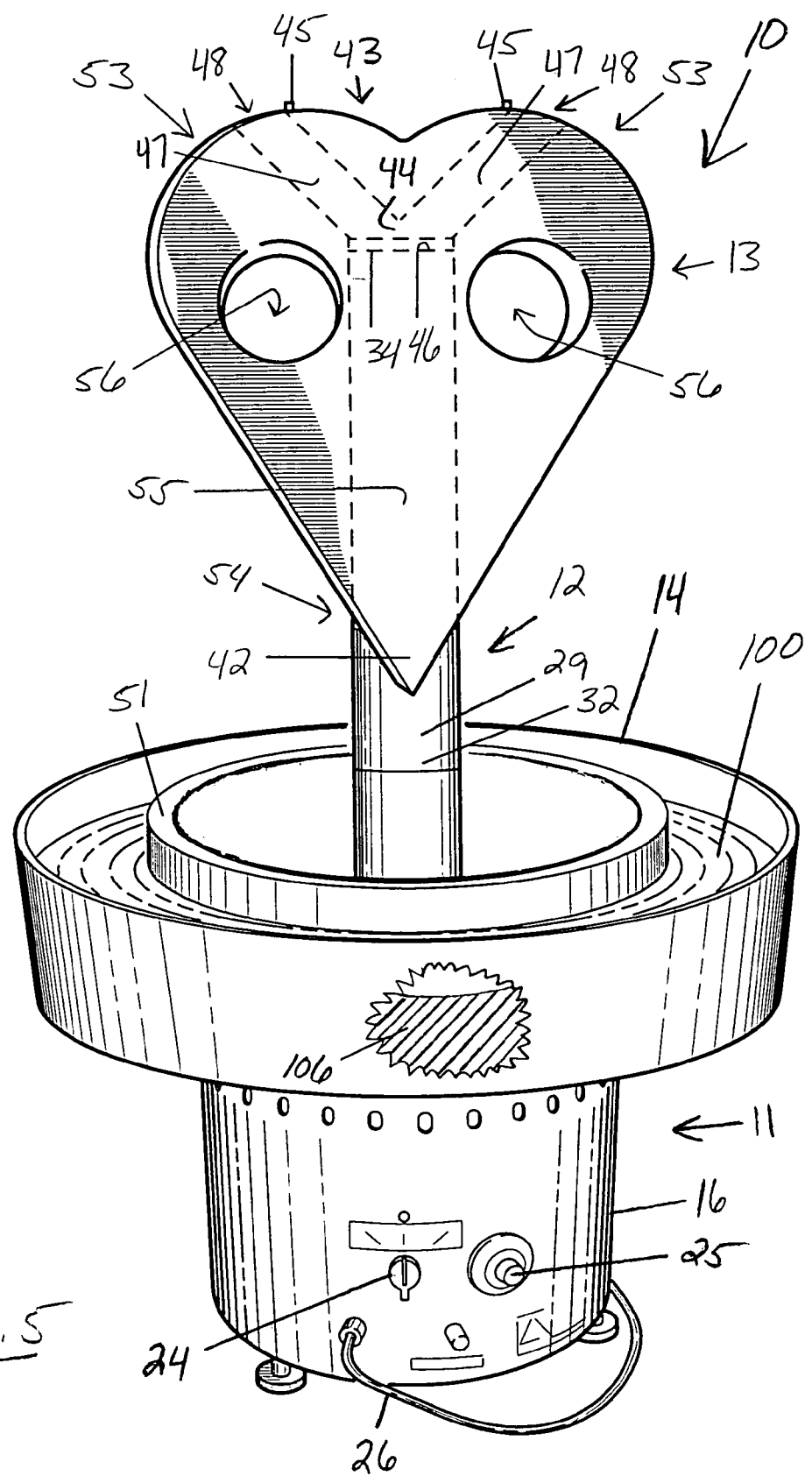
FIG. 5 is a perspective view of the base assembly, the conduit assembly, the annular basin, and the sculpture assembly in assembled relation with certain parts of the annular basin broken away to show a coloration of a pooled liquid chocolate source contained therein and a conduit system internal to the sculpture system shown in broken lines.
Figure 6:
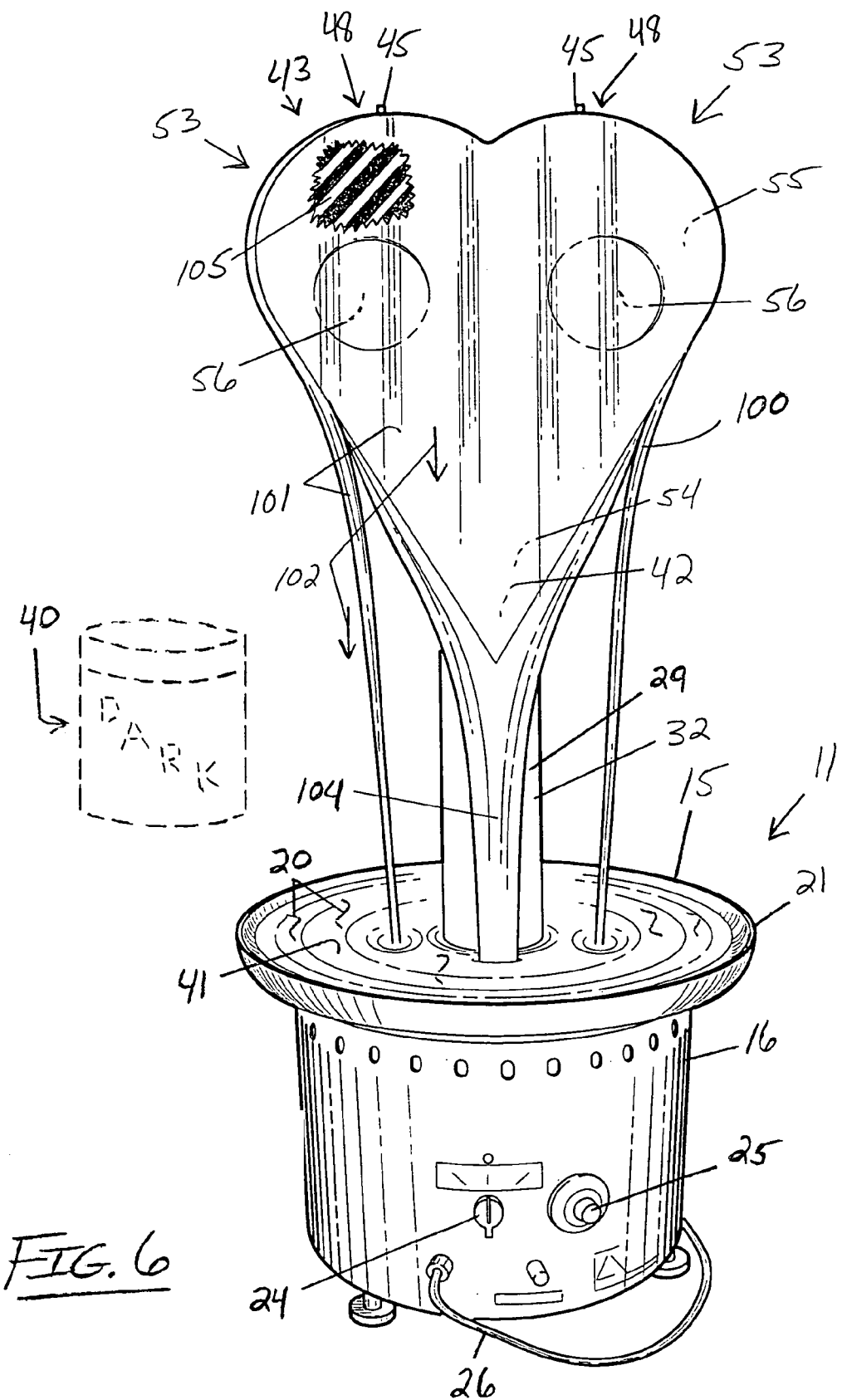
FIG. 6 is a perspective view of the base assembly, the conduit assembly, and the sculpture assembly with flowing chocolate coating the sculpture assembly with a 'DARK' chocolate source shown in broken lines and certain parts of the flowing chocolate broken away to show a coloration of a flowing chocolate.

The liquid chocolate fountain assembly 10 enables users thereof to self-serve themselves or coat morsels and the like with liquid chocolate 100 or similar other confectionary liquid as generally illustrated and referenced in FIGS. 4-6. In this regard, it is contemplated that confection enthusiasts and chocolate lovers may dip morsels of food and the like into either pooled liquid chocolate or flowing liquid chocolate for coating the morsels as a means to enhance the overall feasting experience, it being noted that chocolate-coated morsels and the like are considered highly desirous among confectionary enthusiasts.

Figure 2:
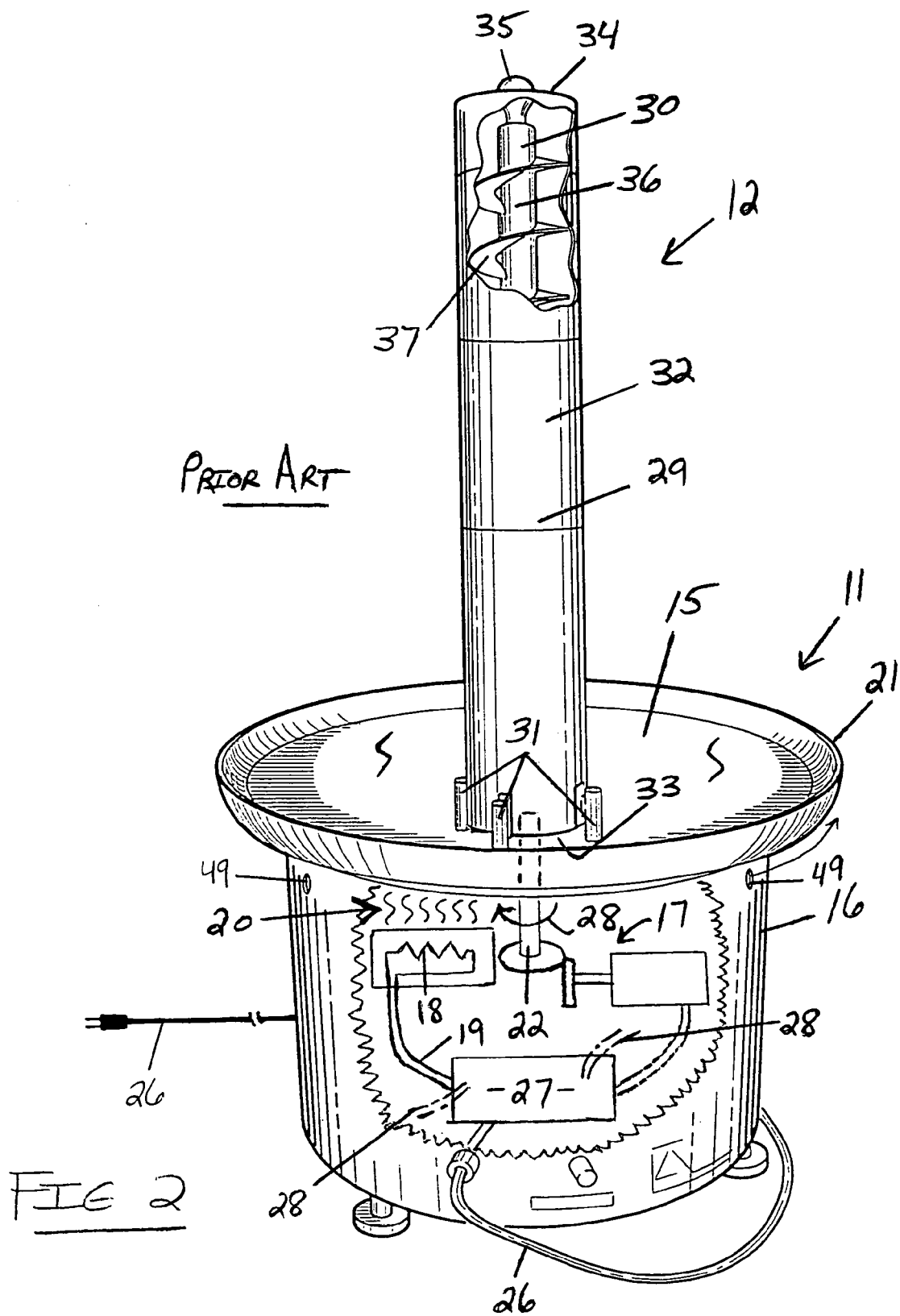
FIG. 2 is a perspective view of a prior art base assembly and conduit assembly in assembled relation with certain parts of the conduit assembly broken away to show a rotatably received auger assembly and certain parts of the base assembly broken away to show generic heat-generating means, a generic motor assembly, and certain generic electrical circuitry.
Figure 3:
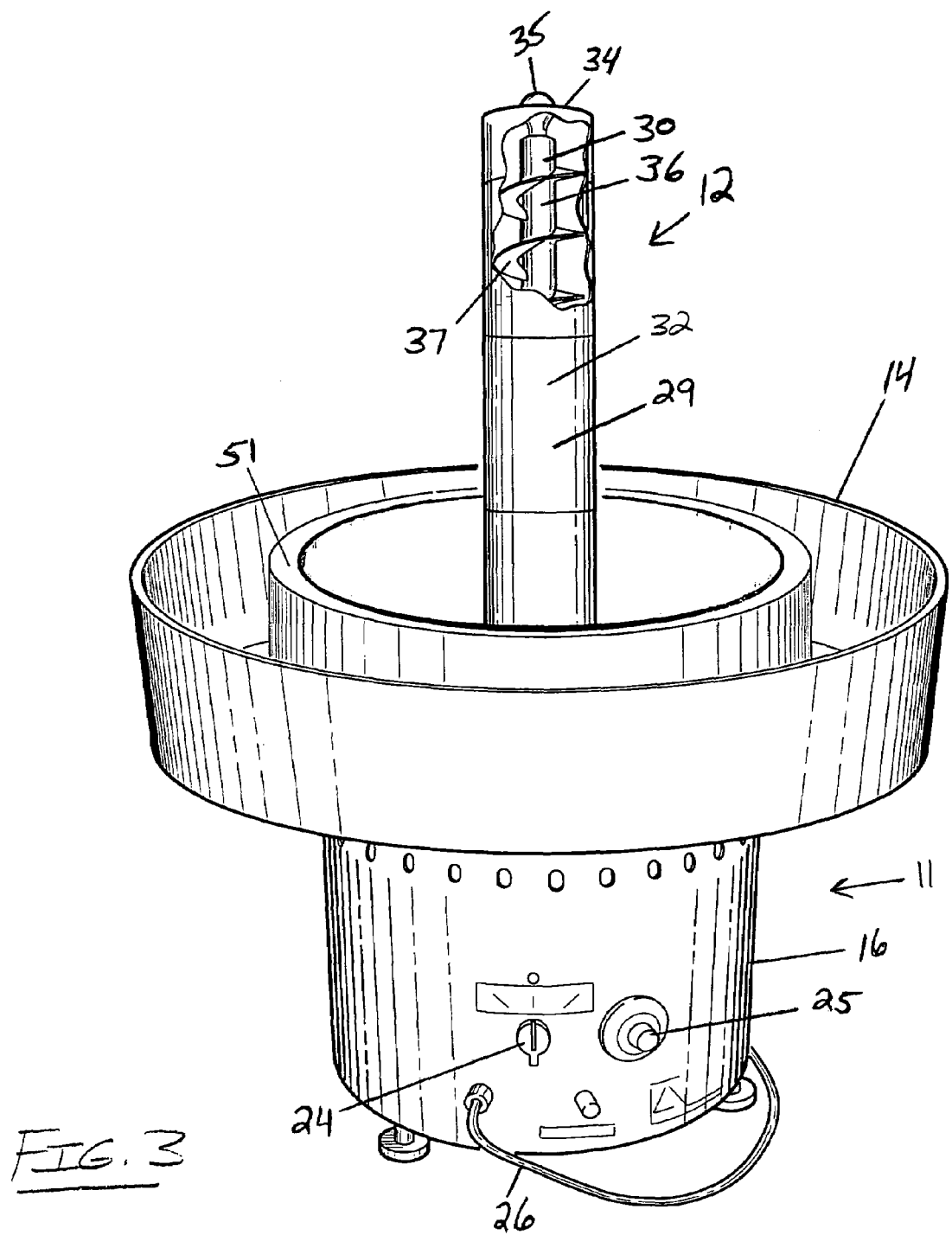
FIG. 3 is a perspective view of the base assembly, the conduit assembly, and the annular basin in assembled relation with certain parts of the conduit assembly broken away to show a rotatably received auger assembly.

The liquid chocolate fountain assembly 10 preferably comprises, in combination, a base assembly 11 as illustrated and referenced in FIGS. 1-6; certain liquid elevation means, as preferably defined by a consumable liquid elevation assembly 12 as illustrated and referenced in FIGS. 1-5; a functional sculpture assembly 13 or outer decorative surface assembly as illustrated and referenced in FIGS. 4 and 5; and an annular or outer basin 14 as illustrated and referenced in FIGS. 3-5. In this last regard, it should be noted that the base assembly 11 and the liquid elevation assembly 12 may be considered prior art and have been labeled as such in the noted figures. In combination with certain foundational prior art components, as taught in part, by the Muir et al. disclosures previously noted, it is believed that the sculpture assembly and the annular basin as more fully specified hereinafter contribute to a novel combination of elements.

The base assembly 11 preferably comprises a circular bowl assembly 15 as illustrated and referenced in FIGS. 1, 2, and 6; a housing assembly 16 as illustrated and referenced in FIGS. 1-6; certain heat-generating means, and a motor assembly 17 as generically depicted in FIG. 2. It is contemplated that the heat-generating means may be defined by a heating element as generically depicted as a resistance 18 in line with a circuit 19, which heating element off-lets thermal energy 20 when current is driven through the resistance 18 as further depicted in FIG. 2. The circular bowl assembly 15 preferably a bowl-shaped receptacle or portion and certain conduit-retaining means, such as bolts or similar other fastening hardware (not specifically illustrated). The bowl-shaped receptacle is preferably constructed from a food-grade, heat-conductive, weight-bearing material and preferably comprises an outer bowl rim 21 as illustrated and referenced in FIGS. 1, 2, and 6; a bowl diameter; and a central shaft-receiving aperture (not specifically illustrated) through which extends a drive shaft 22 of motor assembly 17 as generally depicted in FIG. 2.

It will be noted from an inspection of the noted figures that the housing assembly 16 contains or houses the heat-generating means and the motor assembly 17 and further preferably comprises certain heat-controlling means, certain motor-controlling means, and certain electrical circuitry. The heat-controlling means have been generically depicted by a temperature knob 24 and the motor-controlling means have been generically depicted by a speed knob 25 in FIGS. 1 and 3-6. Temperature knob 24 and speed knob 25 are contemplated to be electrical communication (via certain circuitry 28 as shown in broken lines in FIG. 1 and as shown in phantom lines in FIG. 2) with a power source, as typified by an electrical outlet in electrical communication with the liquid chocolate fountain assembly 10 via a power cord 26 as illustrated and referenced in FIGS. 1-6.

The knobs 24 and 25 (i.e. means for imparting variable resistance) are in electrical communication with certain electrical circuitry as may be generically depicted by a black box 27 in FIG. 2 for enabling the user to manually control the thermal energy output via the heat-generating means and for enabling the user to manually control the speed of rotational movement of the drive shaft 22 via the motor assembly 17 as generally depicted at vector 28 in FIG. 2. As specified, the motor assembly 17 essentially comprises the drive shaft 22 and certain shaft-rotating means (as may be typified by an electric motor having gears for creating rotational movement). The electrical circuitry is communicable with a power source (as simply taught by an electrical outlet) and communicates electrical current with both the heat-generating means and the motor assembly. The motor-controlling means enable the user to selectively control the shaft-rotating means for adjusting the rotational or angular velocity of drive shaft 22 (the drive shaft 22 thus having an axis of rotation extending therethrough).

The liquid elevation assembly 12 preferably comprises an outer conduit assembly 29 as illustrated and referenced in FIGS. 1-6; and an inner auger assembly 30 as generally illustrated in partial view in FIGS. 1-3. The conduit assembly 29 is preferably constructed from food grade material and comprises a conduit member 32 as referenced in FIGS. 1-6, and certain bowl-attachment means as may be preferably defined by certain bolt-receiving structure 31 generally depicted in FIGS. 1 and 2. The conduit member 32 inherently comprises a first conduit end attachable to the bowl assembly 15 thereby defining a liquid chocolate inlet 33 as generally referenced in FIGS. 1 and 2. The conduit member 32 further comprises a second conduit end 34 as generally referenced in FIGS. 1-3, and 5. It should be noted from an inspection of the noted figure that conduit member 32 further comprises a substantially uniform inner conduit diameter for rotatably receiving the auger assembly 30.

The auger assembly 30 inherently comprises a first auger end (hidden from view inside the first conduit end adjacent liquid inlet 33); a second auger end 35 as generally referenced in FIGS. 1-3; and a substantially uniform dynamic auger diameter. In other words, the auger assembly 30 comprises a helical blade member 37 extending radially outward from a central auger shaft 36. The radial distance from the axis of auger shaft 36 to the outer edge of the helical blade member 37 is substantially uniform over the length of the auger assembly 30. The helical blade member 37, when rotated (via drive shaft 22) forces liquid chocolate upward intermediate the auger shaft 36 and the inner conduit diameter. It will be understood that the housing assembly 16 supports the bowl assembly 15 and the drive shaft 22 extends through the shaft-receiving aperture of the bowl assembly 15. The first auger end is coupled to the drive shaft 22 and the auger assembly 30 is rotatably received within the conduit member 32 (the dynamic auger diameter is thereby rotatable about the axis of rotation in inward adjacency to the inner conduit diameter).

A first quantity or source 40 of heat-liquefiable consumable matter such as chocolate (such as 'DARK' chocolate) is generically depicted in broken lines in FIG. 6 (which may be pre-liquefied or melted via a secondary heat source such as a range top) and is received in the bowl-shaped receptacle. Notably, other heat-liquefiable types of consumable matter include butter, cheese, certain creams, and so forth. The heat-controlling means enable the user to selectively generate a desired amount of thermal energy 20, which thermal energy 20 is transferred via classical thermal energy transfer principles such as conduction, convection, and radiation into the first quantity 40 of heat-liquefiable chocolate. In this last regard, it is noted that the base assembly may comprise vents 49 for allowing convective thermal energy to transfer radially outward and upward as generically depicted at arrow 110 in FIG. 2.

While radiant thermal energy may also transfer to surrounding components directly adjacent the heating element, it is contemplated that a significant amount of thermal energy may be transferred to surrounding structures via convective and conductive energy transfer. In terms of conductive heat transfer, it is contemplated that thermal energy 20 may be transferred into the first quantity or source 40 of heat-liquefiable chocolate via the heat conductive material of the bowl-shaped receptacle thus forming a first pooled liquid chocolate source 41 as further depicted in FIG. 6. The auger or auger assembly 30 may thus function to raise liquid chocolate (as inlet at the liquid chocolate inlet 33) from the first pooled liquid chocolate source 41 via the conduit member 32 to the second conduit and auger ends 34 and 35.

The functional sculpture assembly 13 has been depicted as having a heart-shaped outer decorative surface not only for ease of illustration but for structural effectiveness as described in more detail hereinafter. The functional sculpture assembly 13 is preferably fabricated from food grade materials and inherently comprises a first sculpture end 42 as illustrated and referenced in FIGS. 4-6; a second sculpture end 43 as illustrated and referenced in FIGS. 4-6; a outer decorative surface (for example, a heart shape as generally depicted); an inner or internal liquid-diverting junction 44 as referenced in FIG. 5; and certain baffle means or baffles 45 as referenced in FIGS. 4-6. It will be seen from an inspection of FIG. 5 that the liquid-diverting junction 44 is preferably located intermediate the first sculpture end 42 and the second sculpture end 43 and comprises a junction inlet 46 as depicted in FIG. 5; at least two chocolate channels 47 as depicted in FIG. 5; and at least two chocolate outlets 48 (at the second sculpture end 43) as generally referenced in FIGS. 4-6.

Key to the functionality of the functional sculpture assembly 13 and the invention in general is the cooperative association between the junction 44 and the conduit assembly 12. In this regard, it should be noted that the junction inlet 46 comprises a certain (transverse) inlet area and is tightly coupled to the second conduit end 34 for creating certain hydraulic pressure within the rising liquid chocolate as it enters the junction 44. The chocolate channels 47 extend from the junction inlet 46 to the chocolate outlets 48 and each have a substantially uniform transverse cross-sectional channel area.

The sum of the channel areas is notably lesser in magnitude than the inlet area and the hydraulic pressure within the rising liquid chocolate thus forces the viscous rising liquid chocolate from the junction inlet 46 to the chocolate outlets 48, which outlets may be situated in a higher elevation relative to the junction inlet. It will thus be noted that the hydraulic pressure here noted is sufficient to overcome gravitational force to provide a net upward flow of liquid chocolate. The outlet liquid chocolate or liquid chocolate as outlet from the chocolate outlets 48 thereafter flows under direction by the contours of the outer decorative surface and by gravitational force for coating the outer decorative surface. The baffle means or baffles 45 are specifically positioned at the second sculpture end 43 adjacent the chocolate outlets 48 for further directing the flowing liquid chocolate 101 to coat the entire outer decorative surface. As will be seen from an inspection of FIG. 6, the flowing liquid chocolate 101 is directed or returns (as at vectors 102) to the circular bowl assembly 15 for recirculation.

As noted, the outer decorative surface of the functional sculpture assembly 13 may preferably resemble a heart as generally depicted in FIGS. 4-6. Typical, heart-shaped structures, such as the one depicted in the noted figures, comprise first and second superior heart lobes 53 (at the second sculpture end 43 in the illustrations provided); a pointed inferior heart portion 54 (at the first sculpture end 42); an anterior sculpture face 55; and a posterior sculpture face (not specifically referenced). These structures are all present in the heart-shaped outer decorative surface of the sculpture assembly herein disclosed. Notably, the anterior sculpture face 55 and the posterior sculpture face may be smooth as generally depicted in FIG. 4, but may optionally comprise morsel-receiving structure. In this regard, it is contemplated that the first and second heart lobes 53 may each preferably comprise an article or morsel-receiving aperture 56, which apertures 56 extend from the anterior sculpture face 55 to the posterior sculpture face for enabling the user to coat morsels with liquid chocolate without contacting the outer decorative surface (via flowing liquid chocolate 101) or without contacting the first pooled liquid chocolate source 41. The moisture-receiving apertures 56 may alternatively, however, provide morsel-receiving space and thus not extend entirely through the sculpture from the anterior surface to the posterior surface, but rather embody morsel-receiving hollows, which hollows may be positioned virtually anywhere on the outer decorative surface for enabling the user to dip morsels into the hollows or apertures for coating morsels with liquid chocolate or for otherwise self-serving the liquid chocolate without contacting the actual structure of the assembly.

As briefly introduced hereinabove, it should be further understood from an inspection of FIG. 5 that the liquid-diverting junction 44 receives the second conduit end 34 intermediate the anterior sculpture face 55 and the posterior sculpture face and further intermediate the morsel-receiving apertures 56 for providing relatively obstacle-free internal liquid chocolate pathways. In other words, the straighter the chocolate paths, the less likely it will be for chocolate to become lodged within the internal pathways. Notably, the chocolate outlets 48 are preferably located at the superior most portions of the first and second heart lobes 53 not only to provide certain means for directing flowing chocolate over a greater portion of the outer decorative surface. Furthermore, the pointed inferior heart end 54 functions to direct flowing liquid chocolate 101 into the bowl-shaped receptacle as generally depicted at reference numeral 104 in FIG. 6. The baffle structure of baffles 45 are preferably structurally situated or located medially adjacent the chocolate outlets 48 at the second sculpture end 43 for directing the flowing liquid chocolate 101 to flow over the first and second lobes 53 as well as the morsel-receiving apertures 56.

The annular or outer basin 14 is also preferably constructed from food grade, heat-conductive, weight-bearing material and inherently comprises an inner basin diameter and an outer basin diameter, the volumetric portions therebetween for receiving a second quantity 50 of heat-liquefiable chocolate (as generically depicted in broken lines in FIG. 4). The basin 14 further preferably comprises certain basin support means as preferably defined by an annular flange 51 or inner support flange, which flange 51 extends radially inward from the inner basin diameter as generally depicted in FIGS. 3-5. Notably, the annular flange 51 has an inner flange diameter. The inner basin diameter is preferably greater in magnitude than the bowl diameter and the inner flange diameter is preferably lesser in magnitude than the bowl diameter. Thus, the annular basin 14 is supportable upon the bowl-shaped receptacle as seated thereupon via the annular flange (the construction of basin 14 comprising sufficient weigh-bearing material) and the outer rim 21 of the bowl-shaped receptacle. Alternatively, it is contemplated that the outer basin 14 may be integrally formed to the bowl member, as for example, by welded attachment, and thus an annular flange need not be present if the inner upper portion of the outer basin is directed welded to the bowl-shaped member. Key, however, is the thermal energy flow intermediate the bowl-shaped receptacle and the outer basin 14 such that the thermal energy may effectively liquefy matter located in the outer basin 14 (if the consumable liquid of choice is heat-liquefiable).

The second quantity 50 of liquefiable chocolate (such as 'MILK' chocolate) is thus received in the annular basin 14 and thermal energy 20 may be transferred into the second quantity of liquefiable chocolate via the heat conductive material of the annular basin 14 as originating from the heating element and being transferred to surrounding structures via conductive heat materials and/or the vents 49. The heat transfer into basin 14 thus operates to form a second pooled liquid chocolate source 52 as generally depicted in FIG. 4. Notably, the first pooled liquid chocolate source 41 may comprise a first chocolate coloration (dark brown chocolate) as referenced at hatch markings 105 in FIG. 6 and the second pooled liquid chocolate source 51 may comprise a second chocolate coloration (light brown chocolate) as referenced at hatch markings 106 in FIG. 5.

In this last regard, it is contemplated that the first chocolate coloration, as representative of a first type of confectionary liquid or chocolate, may differ from the second chocolate coloration, as representative of a second type of confectionary liquid or chocolate, for providing a dual-colored (or two types of chocolate) liquid chocolate serving assembly. The flowing liquid chocolate 101, the first pooled liquid chocolate source 41, and the second pooled liquid chocolate source 51 thus enable the user to coat morsels with liquid chocolate (for example, by dipping bite-sized bits of food into the liquid chocolate) thereby decrementing the liquid chocolate quantities, possibly requiring the deposition of refill chocolate into the assembly.

Conceivably, the present invention thus teaches a confectionary fountain assembly for enabling a user to coat morsels with certain confectionary liquid(s) and essentially comprises a bowl assembly, certain liquid elevation means (such as the cooperative association of the liquid elevation assembly 29 with the motor assembly 17 and associated driving electrical components as heretofore specified), an outer decorative sculpture surface and an inner sculpture conduit (such as junction 44). The bowl essentially comprises a bowl center and an outer bowl rim into which is received an initial quantity of confectionary liquid for forming a (first) pooled confectionary liquid source. The liquid elevation means are cooperatively associated with the pooled confectionary liquid source for raising a confectionary liquid portion. The rising confectionary liquid portion is forced into the liquid conduit for creating hydraulic pressure within the rising liquid portion. The liquid conduit of the present invention has an inlet and an outlet, each of which have an area through which a liquid flow passes. Notably, the outlet area is preferably lesser in magnitude than the inlet area such that the hydraulic pressure within the liquid portion forces rising confectionary liquid from the inlet to the outlet. Once the confectionary liquid exits the outlet, the confectionary liquid may then be directed by the contour of the outer decorative sculpture surface and gravitational force to coat the outer decorative sculpture surface whereafter it returns to the bowl for recirculation or consumption.

Thus, it has been shown that the outlet confectionary liquid and the pooled confectionary liquid source enable the user to coat morsels with confectionary liquid. The confectionary fountain assembly may further comprise, however, an outer basin comprising certain basin support means such as an inner support flange, which flange extends inward for supporting the outer basin in concentric relation about the bowl center upon the outer rim. A second quantity of confectionary liquid may be received in the outer basin for forming a second pooled confectionary liquid source. Together, both of the pooled confectionary liquid sources and the outlet confectionary liquid enable the user to coat morsels with confectionary liquid.

Should the initial quantity of confectionary liquid comprise heat-liquefiable chocolate, it is contemplated that the bowl assembly may further comprise certain heat-generating means (including heat-controlling means and certain driving electrical components). In this case, it is further contemplated that the bowl of the bowl assembly may preferably comprise certain heat-conductive material. The heat-generating means may thus enable the user to selectively generate thermal energy, transferable into the heat-liquefiable chocolate via the heat conductive material of the bowl for forming a first pooled liquid chocolate source.

Should the confectionary fountain assembly comprise both a fountain-like sculpture as hereinabove specified and an outer basin, it is contemplated that both the initial and second quantities of confectionary liquid may comprise heat-liquefiable chocolate. Similar to the immediate foregoing descriptions, it is contemplated that the bowl or base assembly may preferably comprise certain heat-generating means and both the bowl and basin may preferably comprise certain heat-conductive materials such that when the user selectively generates thermal energy, the thermal energy may be transferred into the heat-liquefiable chocolate via the heat conductive material of the bowl and basin for forming first and second pooled liquid chocolate sources.

While the foregoing descriptions contain much specificity, the same should not be construed as limiting the scope of the invention, but rather as an exemplification of the invention. For example, it is contemplated that the invention may also teach a liquid chocolate or confectionary liquid serving assembly, the serving assembly enabling a user to coat morsels with the liquid media for enhancing the delectability of the coated morsels. The serving assembly may preferably comprise a base or bowl assembly and an outer basin combination. The base or bowl assembly may comprise a bowl and certain heat-generating means, the bowl comprising heat-conductive material, a bowl center, and an outer rim. The heat-generating means may enable a user to selectively generate thermal energy for transferring the same into the bowl and further into a first quantity of liquefiable chocolate via the heat conductive material of the bowl.

The outer basin may also comprise certain heat-conductive material and certain basin support means for supporting the outer basin in concentric relation about the bowl center at the outer rim or for otherwise supporting the outer basin in adjacency to the outer rim. A second quantity of liquefiable chocolate may be received in the outer basin and the thermal energy, ever seeking thermal equilibrium, may be transferred into the second quantity of liquefiable chocolate via the heat conductive material of the outer basin. The first and second quantities of heat-liquefiable chocolate thus form first and second pooled liquid chocolate sources enabling the user to coat morsels with liquid chocolate.

Accordingly, although the invention has been described by reference to a preferred embodiment of the liquid chocolate fountain assembly or confectionary liquid serving assembly, it is not intended that the novel assembly be limited thereby, but that modifications thereof are intended to be included as falling within the broad scope and spirit of the foregoing disclosure, the following claims, and the appended drawings.

I claim:

1. A confectionary liquid fountain assembly, the confectionary liquid fountain assembly enabling a user to self serve confectionary liquid, the confectionary liquid fountain assembly comprising, in combination:
   a base assembly, the base assembly comprising a circular bowl assembly, a housing assembly, heat-generating means, and a motor assembly, the circular bowl assembly comprising a bowl-shaped receptacle and conduit-retaining means, the bowl-shaped receptacle comprising heat-conductive material, an outer rim, a bowl diameter, and a central shaft-receiving aperture, the housing assembly containing the heat-generating means and the motor assembly and comprising heat-controlling means, motor-controlling means, and electrical circuitry, the motor assembly comprising a drive shalt and shalt-rotating means, the electrical circuitry being communicable with a power source and communicating the power source with the heat-generating means and the motor assembly, the motor-controlling means enabling a user to selectively control the shaft-rotating means, the shalt-rotating means for rotating the drive shalt, the drive shaft thus having an axis of rotation extending therethrough;
   a liquid elevation assembly, the liquid elevation assembly comprising a conduit assembly and an auger, the conduit assembly comprising a conduit member and bowl-attachment means, the conduit member comprising a first conduit end, a second conduit end, and a substantially uniform inner conduit diameter, the auger comprising a first auger end, a second auger end, and a substantially uniform dynamic auger diameter, the housing assembly supporting the bowl-shaped receptacle, the drive shaft extending through the shaft-receiving aperture, the first auger end being coupled to the drive shaft, the auger being received within the conduit member, the dynamic auger diameter being rotatable about the axis of rotation in inward adjacency to the inner conduit diameter, the bowl-attachment means attaching the first conduit end to the conduit-retaining means thereby defining a confectionery liquid inlet at the first auger end, a first quantity of heat-liquefiable confectionery matter being received in the bowl-shaped receptacle, the heat-controlling means enabling the user to selectively generate thermal energy, the thermal energy being transferred into the first quantity of heat-liquefiable confectionery matter via the heat conductive material of the bowl-shaped receptacle thus forming a first pooled confectionery liquid source, the auger for raising confectionery liquid from the first pooled confectionary liquid source via the conduit member to the second conduit and auger ends;
   a functional sculpture assembly, the functional sculpture assembly comprising a first sculpture end, a second sculpture end, an outer decorative surface, an inner liquid-diverting junction, and baffle means, the liquid-diverting junction being located intermediate the first and second sculpture ends and comprising a junction inlet, at least two liquid channels, and at least two liquid outlets at the second sculpture end, the junction inlet having an inlet area and being tightly coupled to the second conduit end for creating hydraulic pressure within the rising confectionary liquid, the liquid channels extending from the junction inlet to the liquid outlets and having a substantially uniform transverse cross-sectional channel area, the sum of the channel areas being lesser in magnitude than the inlet area, the hydraulic pressure thus forcing rising confectionary liquid from the junction inlet to the liquid outlets, the outlet confectionary liquid thereby flowing under gravitational force for coating the outer decorative surface, the baffle means being positioned at the second sculpture end adjacent the liquid outlets for directing the flowing confectionary liquid to coat the entire outer decorative surface, the flowing confectionary liquid returning to the circular bowl; and
   an annular basin, the annular basin comprising a heat-conductive material, an inner basin diameter, an outer basin diameter, and an annular flange, the annular flange extending radially inward from the inner basin diameter, the annular flange having an inner flange diameter, the inner basin diameter being greater in magnitude than the bowl diameter, the inner flange diameter being lesser in magnitude than the bowl diameter, the annular basin thus being supportable upon the bowl-shaped receptacle via the annular flange and the outer rim, a second quantity of heat-liquefiable confectionary matter being received in the annular basin, the thermal energy being transferred into the second quantity of heat-liquefiable confectionary matter via the heat conductive material of the annular basin thus fanning a second pooled confectionary liquid source, the flowing confectionary liquid and the first and second pooled confectionary liquid sources enabling the user to coat morsels with confectionery liquid.

2. The confectionary liquid fountain assembly of claim 1 wherein the first pooled confectionery liquid source has a first coloration and the second pooled confectionery liquid source has a second coloration, the first coloration differing from the second coloration for providing a dual-colored confectionery liquid serving assembly.

3. The confectionary liquid fountain assembly of claim 1 wherein the outer decorative surfaces resembles a heart, the heart comprising first and second superior heart lobes at the second sculpture end, a pointed inferior heart portion at the first sculpture end, an anterior sculpture face, and a posterior sculpture face, the first and second heart lobes each comprising an article-receiving aperture, the article-receiving apertures extending from the anterior face to the posterior face for enabling the user to self-serve confectionary liquid without contacting the outer decorative surface or the first pooled confectionary liquid source.

4. The confectionary liquid fountain assembly of claim 3 wherein the pointed inferior heart end directs flowing confectionery liquid into the bowl-shaped receptacle.

5. The confectionary liquid fountain assembly of claim 4 wherein the baffle means are located medially adjacent the liquid outlets at the second sculpture end for directing the flowing confectionary liquid to flow over the first and second heart lobes and the article-receiving apertures.

6. The confectionery liquid fountain assembly of claim 5 wherein the liquid-diverting junction receives the second conduit end intermediate the anterior and posterior sculpture faces and the article-receiving apertures and wherein the liquid outlets are located at the superior most portions of the first and second lobes for providing obstacle-free internal confectionary liquid pathways.

7. A liquid fountain assembly, the liquid fountain assembly enabling a user to self-serve consumable liquid, the liquid fountain assembly comprising:

a base assembly, the base assembly comprising a bowl assembly, a housing assembly, heat-generating means, and a motor assembly, the bowl assembly comprising a bowl-shaped receptacle, the bowl-shaped receptacle comprising heat-conductive material, an outer rim, and a central shaft-receiving aperture, the housing assembly comprising electrical circuitry, the motor assembly comprising a drive shaft and shaft-rotating means, the electrical circuitry being communicable with a power source and communicating the power source with the heat-generating means and the motor assembly for enabling a user to selectively control the heat-generating means and the motor assembly;

a liquid elevation assembly, the liquid elevation assembly comprising a conduit assembly and an auger, the conduit assembly comprising a conduit member, the conduit member comprising a first conduit end, a second conduit end, and a substantially uniform inner conduit diameter, the auger comprising a first auger end, a second auger end, and a substantially uniform dynamic auger diameter, the housing assembly supporting the bowl-shaped receptacle, the drive shaft extending through the shaft-receiving aperture, the first auger end being coupled to the drive shaft, the auger being received within the conduit member, the dynamic auger diameter being rotatable in inward adjacency to the inner conduit diameter, the first conduit end being attachable in superior adjacency to the bowl-shaped receptacle thereby defining a liquid inlet at the first auger end, an initial quantity of heat-liquefiable consumable matter being received in the bowl-shaped receptacle, the heat-generating means enabling the user to selectively generate thermal energy, the thermal energy being transferred into the first quantity of heat-liquefiable consumable matter via the heat conductive material of the bowl-shaped receptacle thus forming a first pooled consumable liquid source, the motor assembly and the auger for raising consumable liquid from the first pooled consumable liquid source via the conduit member to the second conduit and auger ends; and a functional sculpture assembly, the functional sculpture assembly comprising a first sculpture end, a second sculpture end, an outer decorative surface, and an inner liquid-diverting junction, the liquid-diverting junction being located intermediate the first and second sculpture ends and comprising a junction inlet, at least one liquid channel, and at least one liquid outlet, the junction inlet having an inlet area and being tightly coupled to the second conduit end for creating hydraulic pressure within the rising consumable liquid, the liquid channel extending from the junction inlet to the liquid outlet and having a liquid-receiving channel area, the channel area being lesser in magnitude than the inlet area, the hydraulic pressure thus forcing rising consumable liquid from the junction inlet to the liquid outlet, the outlet consumable liquid thereby flowing under gravitational force for coating the outer decorative surface, the flowing consumable liquid returning to the bowl-shaped receptacle, the flowing consumable liquid and the pooled consumable liquid source enabling the user to self-serve consumable liquid.

8. The liquid fountain assembly of claim 7 comprising an outer basin, the outer basin comprising a heat-conductive material and an inner support flange, the inner support flange extending inwardly and supporting the outer basin upon the bowl-shaped receptacle, a second quantity of heat-liquefiable consumable matter being received in the outer basin, the thermal energy being transferred into the second quantity of heat-liquefiable consumable matter via the heat conductive material of the outer basin thus forming a second pooled consumable liquid source, the flowing consumable liquid and the pooled consumable liquid sources enabling the user to self-serve consumable liquid.

9. The liquid fountain assembly of claim 7 wherein the outer decorative surface comprises a plurality of article-receiving apertures, the article-receiving apertures extending into the outer decorative surface for enabling the user to self-serve consumable liquid without contacting the outer decorative surface or the pooled consumable liquid source.

10. The liquid fountain assembly of claim 9 wherein baffle means are positioned adjacent the liquid outlet for directing the flowing consumable liquid to flow over the article-receiving apertures.

11. The liquid fountain assembly of claim 7 wherein the outer decorative surface comprises a pointed inferior sculpture end, the pointed inferior sculpture end for directing flowing consumable liquid into the bowl-shaped receptacle.

* * * * *